(12) United States Patent
Suneya et al.

(10) Patent No.: US 8,219,701 B2
(45) Date of Patent: Jul. 10, 2012

(54) APPARATUS AND METHOD FOR CONTROLLING COMMUNICATION

(75) Inventors: Toru Suneya, Kawasaki (JP); Masahiko Takaku, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 548 days.

(21) Appl. No.: 12/190,475

(22) Filed: Aug. 12, 2008

(65) Prior Publication Data

US 2009/0049188 A1 Feb. 19, 2009

(30) Foreign Application Priority Data

Aug. 14, 2007 (JP) .................................. 2007-211514

(51) Int. Cl.
*G06F 15/16* (2006.01)
(52) U.S. Cl. ......................... 709/231; 709/232; 709/233
(58) Field of Classification Search .................. 709/231, 709/232, 233, 234, 236; 370/238
See application file for complete search history.

(56) References Cited

U.S. PATENT DOCUMENTS

| 5,566,208 | A | * | 10/1996 | Balakrishnan | ................ | 375/240 |
| 5,578,917 | A | * | 11/1996 | Bottman | ..................... | 324/76.15 |
| 5,822,524 | A | * | 10/1998 | Chen et al. | ..................... | 709/203 |
| 5,922,048 | A | * | 7/1999 | Emura | ............................. | 725/88 |
| 6,557,034 | B1 | * | 4/2003 | Fujita et al. | ................... | 709/223 |
| 6,741,601 | B1 | * | 5/2004 | Tanimura | ....................... | 370/412 |
| 2002/0054635 | A1 | * | 5/2002 | Nagai et al. | ............. | 375/240.01 |
| 2007/0067812 | A1 | * | 3/2007 | Watanabe | ....................... | 725/90 |

FOREIGN PATENT DOCUMENTS

JP 2002-077260 3/2002

* cited by examiner

*Primary Examiner* — Brian J. Gillis
(74) *Attorney, Agent, or Firm* — Canon USA, Inc., IP Division

(57) ABSTRACT

A communication control apparatus includes a data acquiring unit configured to acquire data to be transmitted to a receiving apparatus, a packetizing unit configured to generate packets using the data acquired by the data acquiring unit, a determining unit configured to compute a possible data transmission delay time of the data packetized by the packetizing unit and determine a transmission interval of the packets based on a result of the computation, and a transmission unit configured to transmit the packets generated by the packetizing unit at intervals that are each within the transmission interval determined by the determining unit.

14 Claims, 9 Drawing Sheets

FIG. 4A  W/O CONTROL
FIG. 4B  CONTROL 1
FIG. 4C  CONTROL 2

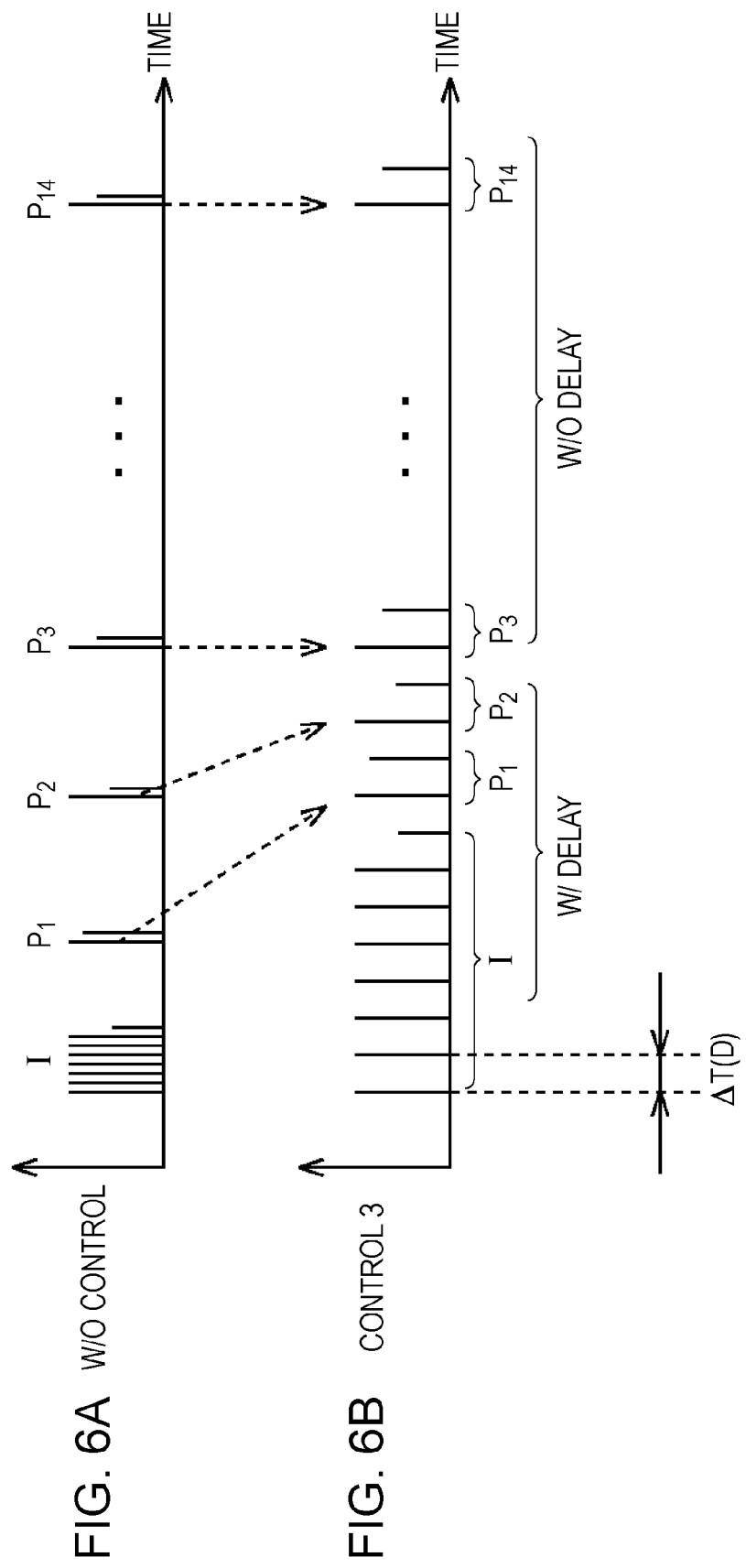
FIG. 6A W/O CONTROL
FIG. 6B CONTROL 3

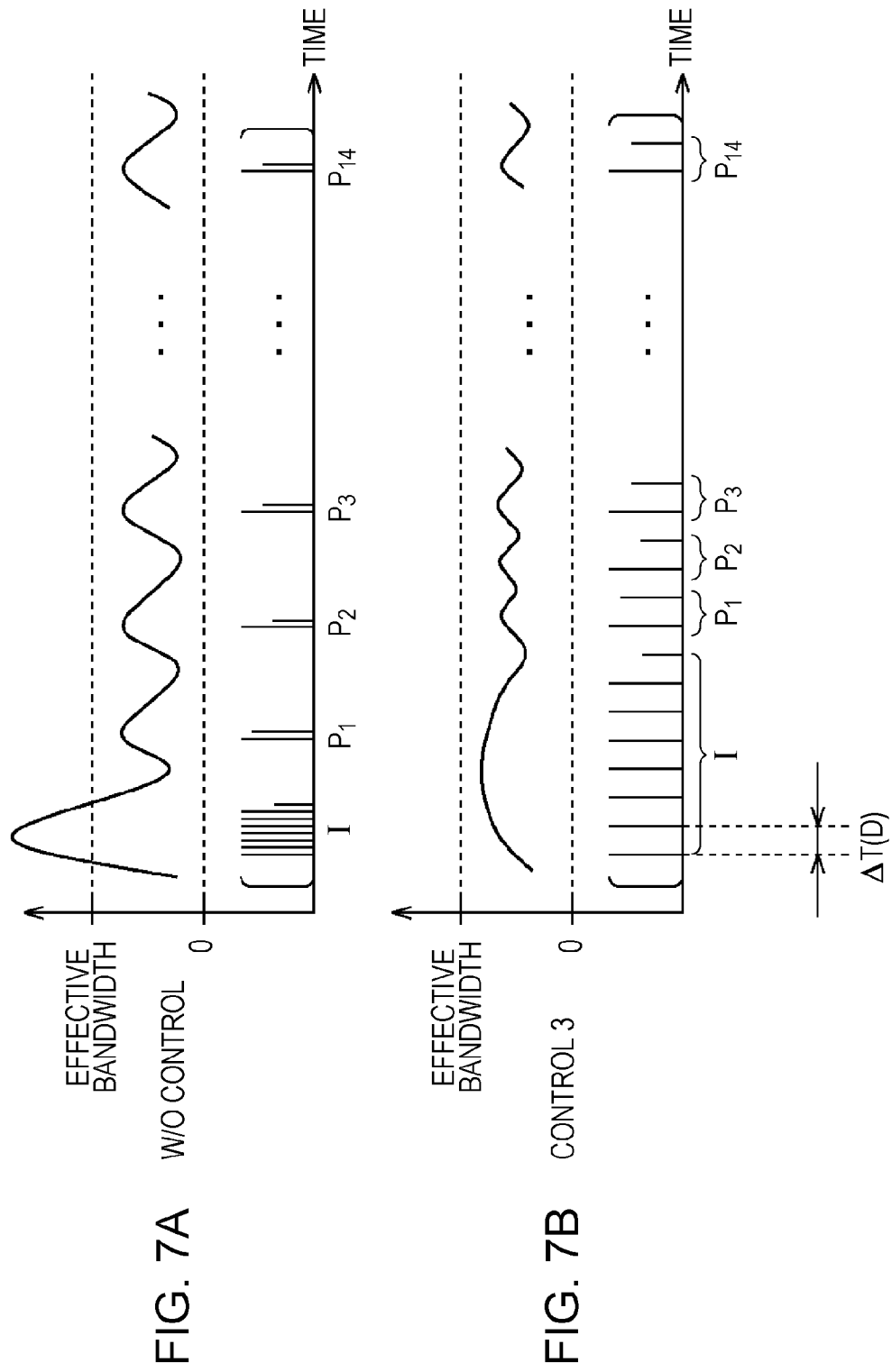

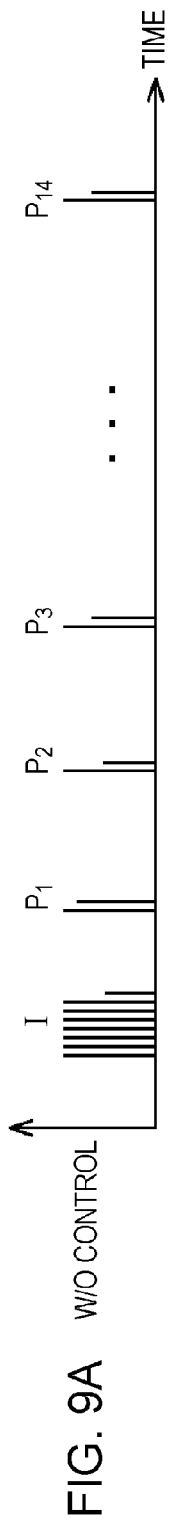
FIG. 9A W/O CONTROL
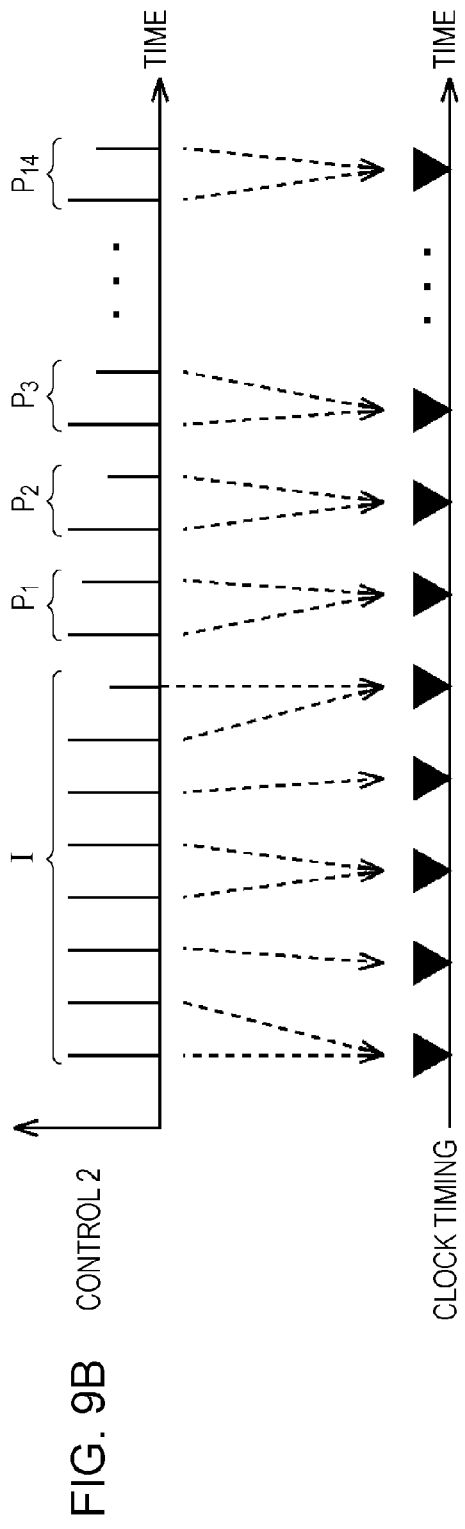
FIG. 9B CONTROL 2
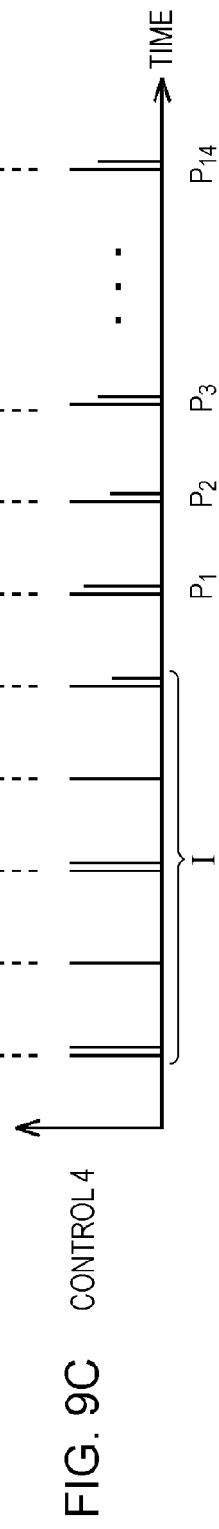
FIG. 9C CONTROL 4

APPARATUS AND METHOD FOR CONTROLLING COMMUNICATION

BACKGROUND OF THE INVENTION

1. Field of the Invention

The present invention relates to an apparatus and a method for controlling communication and, in particular, to a communication control apparatus and a communication control method for performing packet communication.

2. Description of the Related Art

In recent years, with the advancement of communication systems, moving image data that require a relatively large bandwidth of data communication have been delivered to viewers via a communication line, such as the Internet. Thus, viewers can receive moving image data and view moving image.

In general, to deliver such moving image data, in particular, moving image data that is required to be displayed in real time, such as a live image, over a long period of time, a protocol called a transport protocol for real-time applications (RTP) is used. The RTP is designed for transferring speech data or moving image data in real time. The RTP is a protocol defined by the Internet Engineering Task Force (IETF) as RFC 1889 and RFC 1890.

As used herein, data transferred using an RTP protocol (e.g., speech data or moving image data) is referred to as a "stream" or "stream data" as needed.

In general, in real-time communication, such as RTP communication, although the reliability of communication data is not so high, a lower-layer protocol, such as a UDP/IP protocol, is used, since a high communication speed can be relatively easily obtained. RTP communication is designed to be performed using the UDP/IP protocol.

As described above, although communication using a UDP/IP protocol is suitable for a real-time application, an error, such as packet loss, easily occurs. If such an error occurs, part of moving image data may be lost. Accordingly, a variety of techniques for compensating for an error are proposed.

For example, a scheme for limiting the range affected by an error is embedded in the encoded moving image data in the encoding phase. Alternatively, if an error occurs, processing that makes loss of part of moving image data unnoticeable is performed when a moving image is displayed.

In addition, a more reliable communication line has been proposed. Thus, under particular conditions, the error rate is significantly decreased.

On the other hand, in a situation in which an error frequently occurs, it is important to reduce the occurrence of an error.

For example, Japanese Patent Laid-Open No. 2002-77260 describes a technology that reduces the occurrence of an error, such as packet loss. That is, Japanese Patent Laid-Open No. 2002-77260 describes a technology in which by delaying transmission timing points, transmission of packets at very short intervals is prevented. In this way, the occurrence of packet loss caused by data overflow in a buffer in a network path (e.g., a buffer in a router) can be reduced.

However, when packets are transmitted at predetermined time intervals (at predetermined transmission intervals), transmission may not be performed within a frame rate range of moving image data of a stream depending on a transmission rate based on a fixed time or the number of packets transmitted in a given period of time. In the existing technology, such a situation is not taken into account, and therefore, a transmission error may occur.

SUMMARY OF THE INVENTION

The present invention provides an apparatus and a method for controlling communication, and a computer program for reducing a moving-image data transmission error.

According to an embodiment of the present invention, a communication control apparatus includes a data acquiring unit configured to acquire data to be transmitted to a receiving apparatus, a packetizing unit configured to generate packets using the data acquired by the data acquiring unit, a determining unit configured to compute a possible data transmission delay time of the data packetized by the packetizing unit and determine a transmission interval of the packets based on a result of the computation, and a transmission unit configured to transmit the packets generated by the packetizing unit at intervals that are each within the transmission interval determined by the determining unit.

According to the present invention, a packet can be transmitted at a timing point suitable for the characteristics of transmitted data and the characteristic of communication, and therefore, the risk of a transmission error, such as packet loss, can be reduced.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate numerous embodiments of the invention, and, together with the description, serve to explain the principles of the invention.

FIGS. 6A and 6B illustrate examples of a change in packet transmission intervals according to a second exemplary embodiment of the present invention.

FIGS. 7A and 7B illustrate examples of a change in a transmission rate when packets are transmitted using the transmission intervals as shown in FIGS. 6A and 6B, respectively, according to the second exemplary embodiment.

FIGS. 9A to 9C illustrate examples of a change in packet transmission intervals when the packet transmission intervals are controlled on a GOP-to-GOP basis by combining a burst transmission technique with a timing control technique depending on a clock accuracy level according to a fourth exemplary embodiment.

DESCRIPTION OF THE EMBODIMENTS

First Exemplary Embodiment

A first exemplary embodiment of the present invention is described below with reference to the accompanying drawings. The first exemplary embodiment is described with reference to a transmission apparatus, which is an example of a communication control apparatus functioning as a networked camera having a communications capability.

Figure 1:
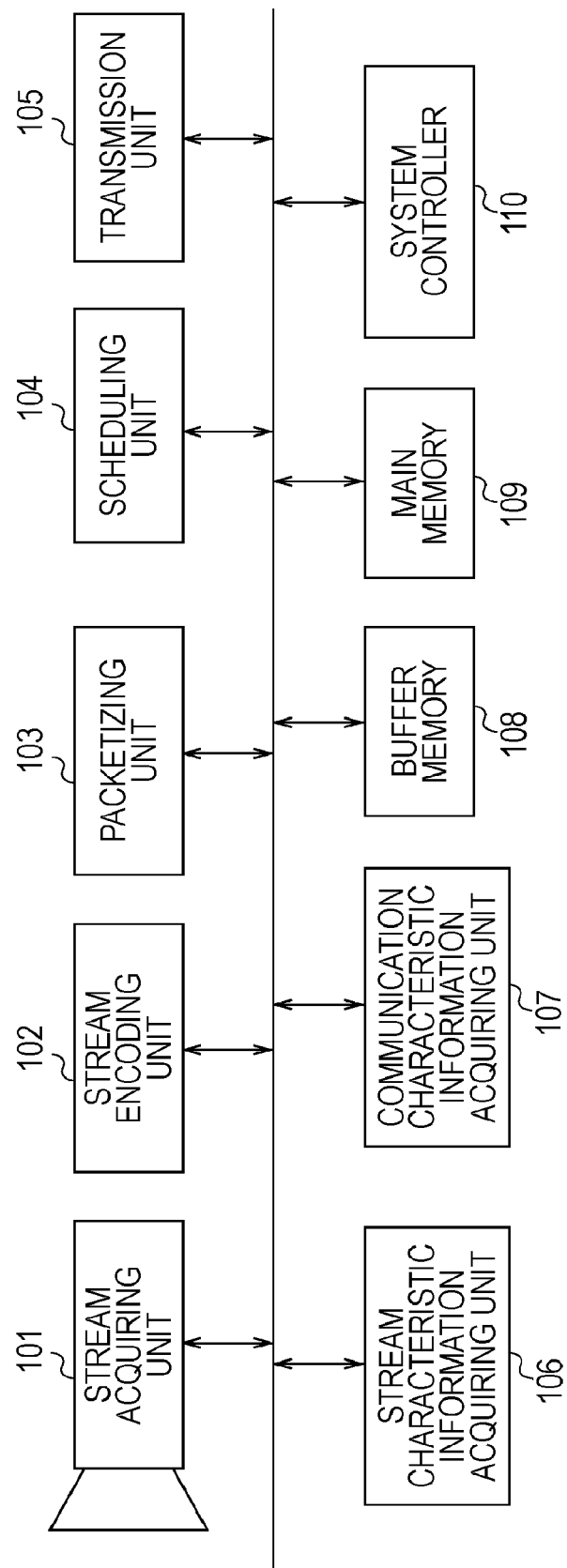
FIG. 1 is a block diagram of an exemplary system configuration including a transmission apparatus according to a first exemplary embodiment of the present invention.

FIG. 1 is a block diagram of an exemplary system configuration including a transmission apparatus.

As shown in FIG. 1, a stream acquiring unit 101 includes an image-capturing unit. The stream acquiring unit 101 acquires stream data including moving image data and audio data as data to be transmitted. It should be noted that the stream data is not limited thereto. Any stream data that is multimedia data including at least one of video data, audio data, and graphic data can be acquired. In the present exemplary embodiment, the stream acquiring unit 101 functions as a data acquiring unit.

The stream data acquired by the stream acquiring unit 101 is encoded in a stream encoding unit 102. The encoded stream data is packetized into packets having a size suitable for data communication by a packetizing unit 103. The packetized stream data is temporarily stored in a buffer memory 108. In the following description, packetized stream data is referred to as "packet data" or a "packet" as needed. In the present exemplary embodiment, the packetizing unit 103 functions as a packetizer.

A stream characteristic information acquiring unit 106 and a communication characteristic information acquiring unit 107 acquire stream characteristic information and communication characteristic information, respectively. In the present exemplary embodiment, the stream characteristic information acquiring unit 106 acquires stream characteristic information indicating the characteristics of the stream data encoded by the stream encoding unit 102. The stream characteristic information includes the bit rate, the frame rate, and the size of a frame of the stream data.

Any types of stream characteristic information that indicates the characteristic of stream data can be used as stream characteristic information. For example, stream characteristic information may include the size of the entire stream data, a decoding time or a playback time of the entire stream data, and the size of stream data for a predetermined processing time. Here, the predetermined processing time may be a time based on the frame rate. More specifically, the predetermined processing time may be a decoding time or a playback time required for one frame of the stream data (the inverse of the frame rate).

In addition, a decoding time or a playback time for a predetermined unit of processing and the size of stream data for a predetermined unit of processing can be used as stream characteristic information. Furthermore, the size of a maximum frame in a predetermined unit of processing and a decoding time or a playback time for a frame of frames included in a predetermined unit of processing can be used s stream characteristic information. In the predetermined unit of processing, at least one frame of stream data is included.

For example, a GOP or GOV described below can be used as the predetermined unit of processing.

As described above, according to the present exemplary embodiment, the stream characteristic information is used for data characteristic information.

In addition to the characteristics of stream data, the communication characteristic information acquiring unit 107 further acquires the following communication characteristic information that indicates the characteristics of communication during transmission of stream data. For example, the communication characteristic information acquiring unit 107 acquires an effective bandwidth of a communication path and the accuracy of a clock for controlling a system including the transmission apparatus (the accuracy of a clock referenced when a packet is transmitted). Any communication characteristic information that indicates the characteristics of communication in which stream data is transmitted and received can be employed.

For example, a packet size, a communication rate for actual communication, a delay time that is allowed for decoding or playing back stream data can be used for the communication characteristic information. Furthermore, a buffer size used for decoding or playing back stream data and an error rate of the communication path can be used for the communication characteristic information. Note that the size of a packet can also be used for the stream characteristic information.

Subsequently, a scheduling unit 104 controls transmission timing of the packet data temporarily stored in the buffer memory 108 based on the stream characteristic information and the communication characteristic information. In this way, according to the present exemplary embodiment, the scheduling unit 104 functions as a determining unit. A transmission unit 105 reads the packet data from the buffer memory 108 in accordance with information about the transmission timing controlled by the scheduling unit 104 and outputs the packet data to a network. In this way, according to the present exemplary embodiment, the transmission unit 105 functions as a transmitter.

A system controller 110 performs overall control of the system shown in FIG. 1 in a process sequence from acquisition of the stream data to transmission of a packet. A main memory 109 provides, as needed, a memory region required by the system controller 110 that performs control.

Figure 2:
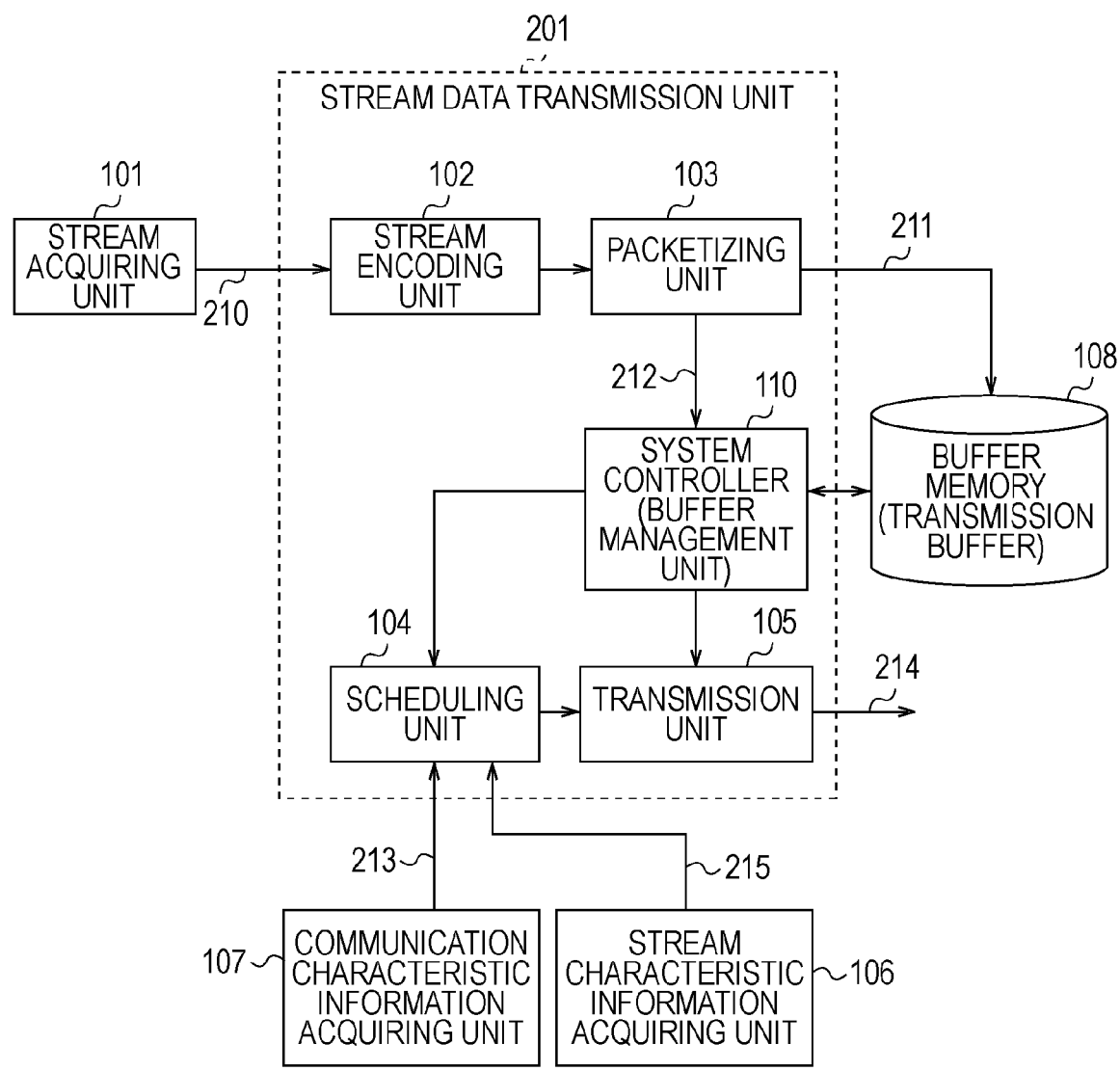
FIG. 2 is a block diagram illustrating an exemplary configuration of the transmission apparatus and a data flow from when the transmission apparatus acquires stream data to when the transmission apparatus transmits packet data according to the first exemplary embodiment.

FIG. 2 is a block diagram illustrating an exemplary configuration of the transmission apparatus and a data flow from when the transmission apparatus acquires stream data to when the transmission apparatus transmits packet data.

As noted above, the stream encoding unit 102 encodes stream data 210 received by the stream acquiring unit 101. The packetizing unit 103 separates the encoded stream data into pieces of data having sizes suitable for communication. The packetizing unit 103 then adds appropriate header information to each of the pieces of the stream data so as to generate a packet 211.

The packet 211 is stored in the buffer memory 108. Information 212 about the stored packet 211 is sent to the system controller 110. In FIG. 2, the buffer memory 108 functions as a transmission buffer, and the system controller 110 functions as a buffer management unit.

The scheduling unit 104 receives stream characteristic information 215 from the stream characteristic information acquiring unit 106. The scheduling unit 104 further receives communication characteristic information 213 from the communication characteristic information acquiring unit 107. The scheduling unit 104 acquires part of the stream characteristic information 215 based on the information 212 about the packet 211 stored in the system controller 110. The scheduling unit 104 computes the transmission timing of the packet 211 based on the received stream characteristic information 215 and the communication characteristic information 213. The computed transmission timing is sent to the transmission unit 105 as transmission timing information.

The transmission unit 105 reads out the packet (packetized stream data) 211 from the buffer memory 108 via the system controller 110. Thereafter, the transmission unit 105 transmits the packet 211 to a path 214 connected to a wired or wireless network.

Exemplary processing performed by the scheduling unit 104 when controlling the transmission timing of the packet 211 is described next.

Figure 3:
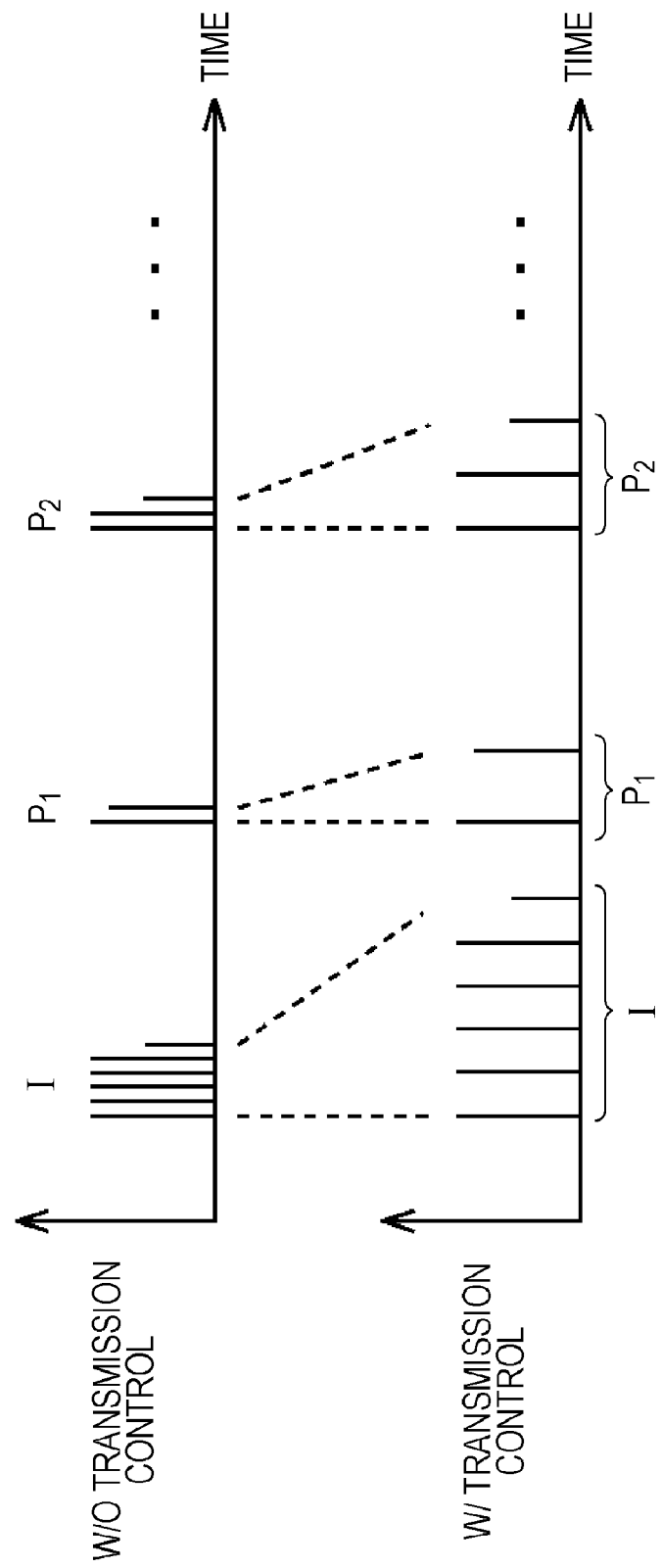
FIG. 3 schematically illustrates an example of a change in packet transmission intervals when transmission timing is controlled based on transmission timing information computed by a scheduling unit according to the first exemplary embodiment.

FIG. 3 schematically illustrates an example of a change in a packet transmission interval when transmission timing is controlled based on the transmission timing information computed by the scheduling unit 104.

As shown in FIG. 3, "I", "$P_1$", "$P_2$", . . . represent the types of frame of encoded moving data. A method of compression coding of moving image data that is widely used when moving image data is to be packetized and transmitted is described next.

Typical methods for compression coding are MPEG-2 (ISO/IEC 13818) and MPEG-4 (ISO/IEC 14496). A compression technique for use in these methods (a technique for compressing each frame of moving image data) includes the following three types.

A first technique is a technique in which compression coding is carried out by performing macro block processing using only information within one frame. A frame compressed by using this technique is known as an I frame (an intra-coded frame).

A second technique is a technique in which, for example, motion compensation prediction and macro block processing are carried out by referencing temporally previous frames. That is, this technique is based on previous frames. A frame compressed by using this technique is known as a P frame (a predicted frame).

A third technique is a technique in which, like the technique used for a P frame, compression coding is carried out by referencing temporally neighboring frames. A P frame is generated by performing compress coding by referencing only temporally previous frames. However, in this technique, motion compensation prediction and macro block processing are carried out by referencing temporally previous and next frames. A frame compressed by using this technique is known as a B-frame (a bi-directional predicted frame).

A set of several encoded frames is called a GOP (group of pictures) for the MPEG-2 encoding method, and is called a GOV (group of video object plane) for the MPEG-4 encoding method. In general, encoded moving image data is composed of successive frames in GOPs or GOVs. As used herein, a set of several encoded frames is referred to as a "GOP". In these techniques, a frame containing an image is called a picture. However, in the following description, a frame is referred to as a "frame", not a "picture".

In FIG. 3, reference symbols "I" and "P" represent an I frame and a P frame, respectively. The subscript numbers attached to "P" is used for identifying frames having the same encoding format. In the diagram entitled "W/O TRANSMISSION CONTROL", the packet transmission intervals are packet transmission intervals of the packets 211 when packet transmission intervals are not controlled. On the other hand, in the diagram entitled "W/ TRANSMISSION CONTROL", the packet transmission intervals are packet transmission intervals of the packets 211 when packet transmission intervals are controlled. These diagrams indicate that the difference between a long packet transmission interval and a short packet transmission interval can be reduced by increasing intervals between transmission time points of packetized data of I frames and P frames. For simplicity, a detailed description for a B frame is not provided in this embodiment.

An exemplary method for computing a transmission timing in the scheduling unit 104 is described next.

As described above, the scheduling unit 104 acquires the stream characteristic information 215 from the stream characteristic information acquiring unit 106 and the system controller 110 and acquires the communication characteristic information 213 from the communication characteristic information acquiring unit 107.

The stream characteristic information 215 required for computation of transmission timing performed by the scheduling unit 104 is different depending on the type of a method for controlling the transmission timing of the packet 211. Accordingly, a piece of stream characteristic information 215 appropriate for a selected method is selected from among the above-described pieces of the stream characteristic information 215.

Figure 4:
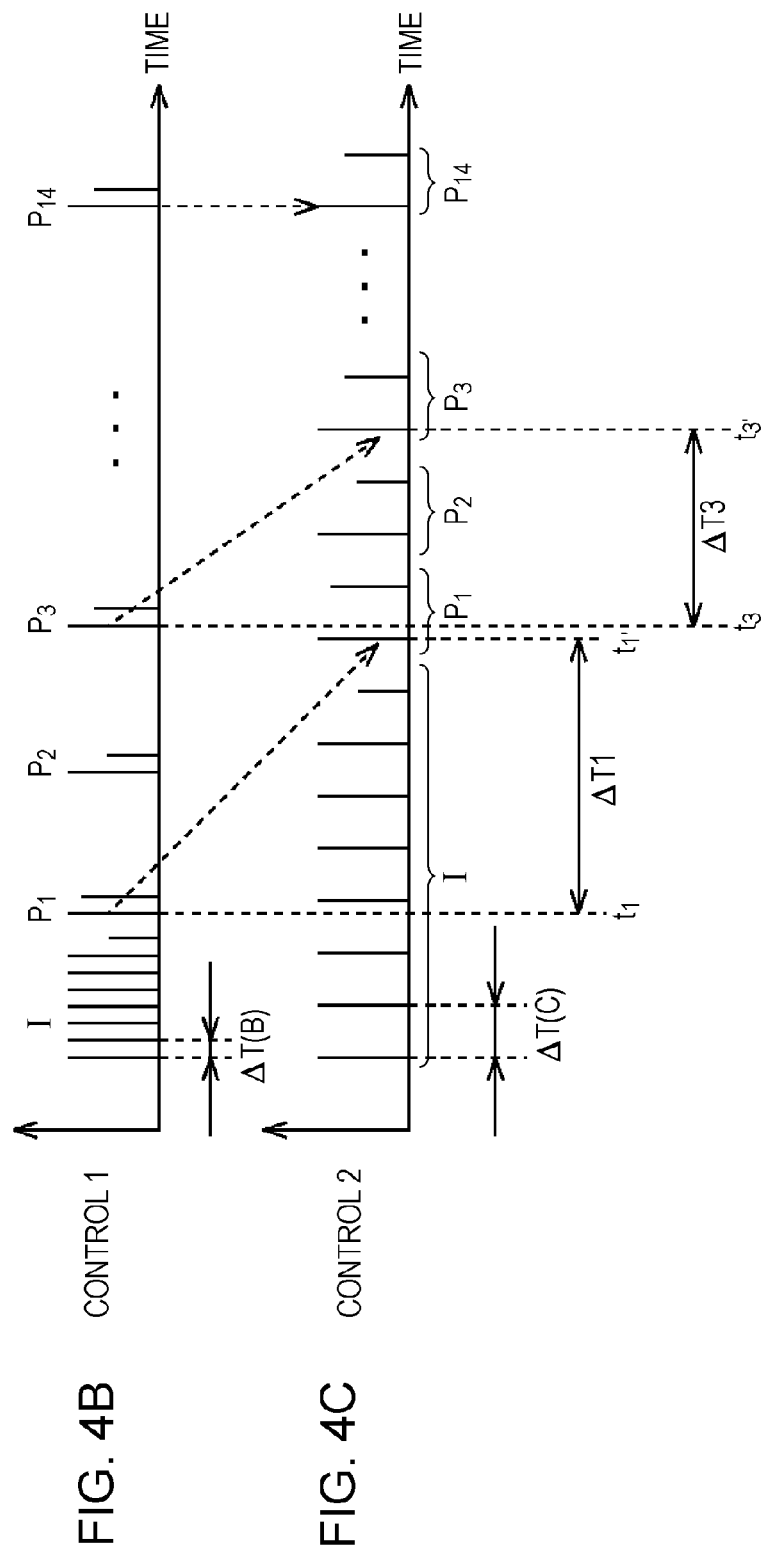
FIGS. 4A to 4C illustrate examples of a change in packet transmission intervals when transmission timing is controlled based on the transmission timing information computed by the scheduling unit according to the first exemplary embodiment.

In the present exemplary embodiment, two more generalized methods are described. One is a method for controlling the transmission intervals of the packets 211 on a frame-to-frame basis while maintaining the frame rate. The other is a method for controlling the transmission intervals of frames included in a GOP on a GOP-to-GOP basis. These two methods are described next with reference to FIGS. 4B and 4C. FIGS. 4A and 4B illustrate examples of changes in packet transmission intervals when transmission timing is controlled based on the transmission timing information computed by the scheduling unit 104.

The diagram entitled "W/O CONTROL" in FIG. 4A illustrates an example of packet transmission intervals when transmission interval control is not performed. The diagram entitled "CONTROL 1" in FIG. 4B illustrates an example of packet transmission intervals when transmission interval control is performed on a frame-to-frame basis while maintaining the frame rate. A diagram entitled "CONTROL 2" in FIG. 4C illustrates an example of packet transmission intervals when transmission interval control is performed on a GOP-to-GOP basis. FIGS. 4A to 4C show the difference between the packet transmission time points in the above-described cases.

In the example shown in FIG. 4A, packet transmission interval control is not performed. Accordingly, the transmission intervals between packets packetized from one frame depends on the accuracy of a processing clock. Therefore, in general, as shown in FIG. 4A, the transmission intervals of packets are reduced.

In the example shown in FIG. 4B, by increasing the transmission intervals between the packets 211 of each frame while maintaining the frame rate, a local variation in the transmission intervals can be reduced. The stream characteristic information 215 required for such a method includes at least the size of a frame and the frame rate. In order to packetize each frame, information about the size of the packet 211 (packet size information) is needed. This size may be a predefined fixed size or a variable size determined when a packet is generated.

This method is described next with reference to FIG. 2. When a frame to be transmitted is packetized by the packetizing unit 103, the scheduling unit 104 acquires, from the system controller 110, packet size information and frame size information sent to the system controller 110. In addition, the scheduling unit 104 acquires frame rate information from the stream characteristic information acquiring unit 106 in the form of the stream characteristic information 215.

Let Pac_Size denote the packet size, Frame_Size denote the frame size, and Frame_rate denote the frame rate. Then, a transmission interval ΔT(B) of the packet 211 shown in FIG. 4B is given by:

$$\Delta T(B) = 1/\text{Frame\_Rate}/(\text{Frame\_Size}/\text{Pac\_Size}) \quad (1)$$

Here, the packet size Pac_Size represents the size of a payload of a packet, excluding the header size of the packet.

The example shown in FIG. 4C is described next. In FIG. 4C, the case in which the transmission intervals of the packets 211 are controlled on a GOP-to-GOP basis is shown. The GOP includes a first I frame and 14 subsequent P frames as expressed by "I, $P_1$, $P_2$, $P_3$, ... $P_{14}$". In this case, control is performed so that the packets 211 of all of the frames that form a GOP are transmitted at equal intervals within a time required for transmitting one GOP. That is, the frame rate for individual frames in the GOP is not necessarily maintained. That is, in the example shown in FIG. 4C, the packets 211 of the first I frame are transmitted using the transmission time assigned for the next P frame $P_1$ and the second next P frame $P_2$ in addition to the time assigned therefor. Accordingly, the transmission start time of the P frame $P_1$ is shifted from a point of time t1 to a point of time t1', and the delay indicated by a difference $\Delta T1$ between the two points of time occurs.

In the exemplary structure of the GOP shown in FIG. 4C, the size of the first I frame is the largest, in general. Therefore, if the sizes of all of the packets 211 are substantially the same, the number of the transmitted packets is the largest for the I frame, as compared with that for each of the other P frames in the GOP. Accordingly, the transmission intervals of the packets 211 are controlled so that the delay time occurring at a time when transmission of the packets 211 of the first I frame is completed is gradually reduced as the subsequent P frames $P_2$, $P_3$, ... are transmitted.

In this way, according to the present exemplary embodiment, the transmission intervals of the packets 211 are controlled so that the delay with respect to the frame rate disappears at a time when transmission of the last P frame $P_{14}$ is completed. For example, as shown in FIG. 4C, a delay time $\Delta T3$ of the frame $P_3$ with respect to the frame rate is smaller than the delay time $\Delta T1$ of the frame $P_1$.

That is, as shown in FIG. 4C, one of the simplest methods for controlling the transmission intervals of the packets 211 on a GOP-to-GOP basis is a method for transmitting packets of each frame of one GOP at equal transmission intervals. When controlling the transmission intervals of the packets 211 using this method, the scheduling unit 104 acquires a playback time $T_{gop}$ for a GOP, an amount $S_{gop}$ of generated code for the entire GOP, and a payload size $P_{gop}$ as the stream characteristic information 215. Subsequently, the scheduling unit 104 can compute a transmission interval $\Delta T(C)$ of the packets 211 using the following equation:

$$\Delta T(C) = T_{gop}/(S_{gop}/P_{gop}) \quad (2)$$

As can be seen from the above description of transmission control of the packets 211, the transmission interval $\Delta T(C)$ is a maximum value of a time during which a GOP to be transmitted is able to be transmitted within the time for a GOP. In this way, the transmission intervals of packets shown in FIG. 4C are determined so that at least some of the transmission intervals of packets shown in FIG. 4C are longer than the transmission interval set when packets are transmitted while maintaining the frame rate (the transmission intervals shown in FIG. 4B).

One of the above-described two methods for controlling transmission intervals of the packets 211 on a GOP-to-GOP basis is more suitable for actual applications than the other.

An example of this method is described next with reference to FIG. 5.

Figure 5:
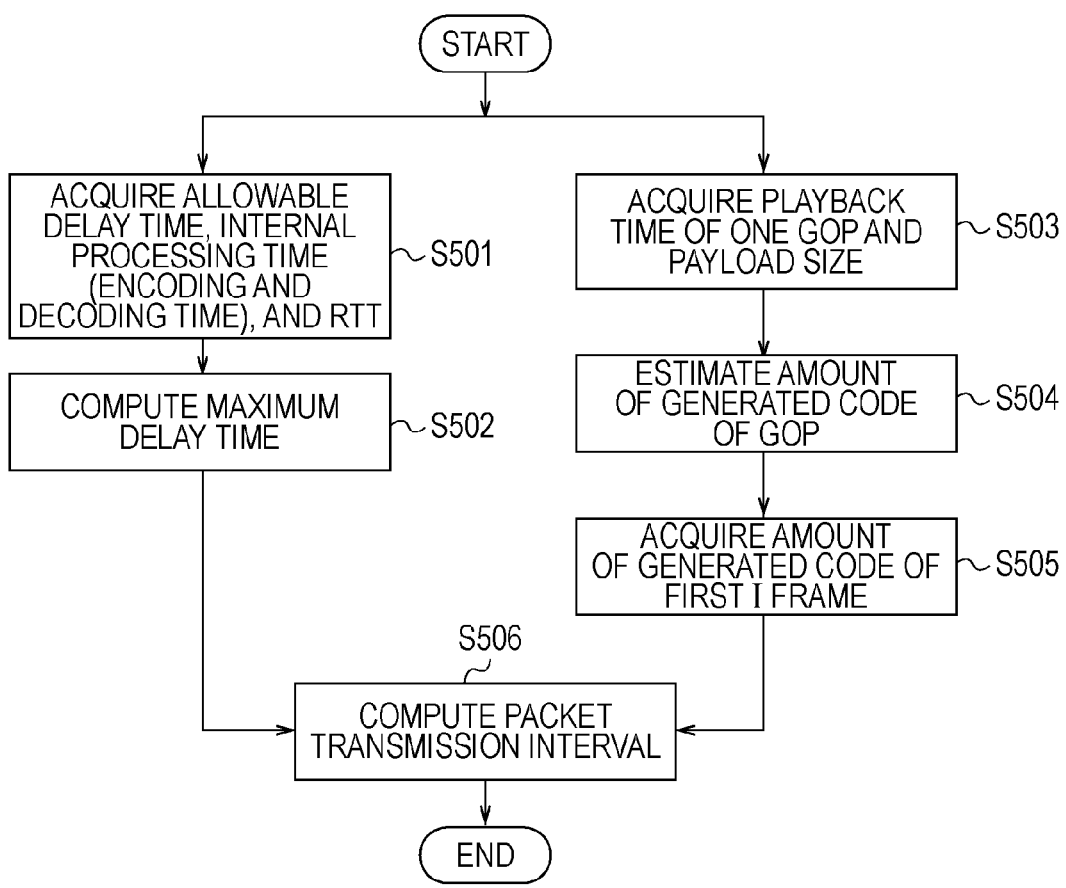
FIG. 5 is a flow chart illustrating an example of the method for controlling (computing) a transmission interval of a packet on a GOP-to-GOP basis when moving image data of a live image is transmitted according to the first exemplary embodiment.

FIG. 5 is a flow chart illustrating an example of the method for controlling (computing) transmission intervals of the packets 211 on a GOP-to-GOP basis when moving image data of a live image is transmitted.

In step S501, the scheduling unit 104 acquires the following information items of the communication characteristic information 213 and the stream characteristic information 215 from the stream characteristic information acquiring unit 106 and the communication characteristic information acquiring unit 107: an allowable delay time before a live image is displayed on a receiving apparatus, a round trip time (RTT) between a transmission apparatus and the receiving apparatus, and an internal processing time (encoding and decoding processing time) in the transmission apparatus and the receiving apparatus. Here, the internal processing time includes a delay time relating to a processing buffer used for the entire encoding and decoding processing.

In step S502, the scheduling unit 104 computes a maximum delay time using the following equation:

$$\text{maximum delay time} = \text{allowable delay time} - \text{internal processing time} - RTT/2 \quad (3)$$

Here, the computed maximum delay time is a maximum time by which a data arrival time can be delayed with respect to the frame rate of moving image data starting from the transmission start time of the packet 211 when packetized data of each frame is delivered from the transmission apparatus to the receiving apparatus within the allowable delay time.

In parallel to the processes performed in steps S501 and S502, the scheduling unit 104, in step S503, performs a process to acquire the playback time for a GOP and the payload size of a generated packet as the stream characteristic information 215 from the stream characteristic information acquiring unit 106. In step S504, the scheduling unit 104 estimates the amount of generated code of a GOP.

In some cases, a delay for a GOP is not allowed or a buffer for storing encoded data for a GOP cannot be provided when the transmission intervals of the packets 211 are controlled on a GOP-to-GOP basis. In such cases, a first frame of a GOP needs to be packetized, and transmission needs to be started before all of the frames of the GOP are encoded. Therefore, the scheduling unit 104 estimates the amount of generated code of the GOP in step S504.

In step S505, the scheduling unit 104 acquires the amount (size) of generated code of the first I frame.

In step S506, the scheduling unit 104 computes transmission intervals of the packets 211 using the maximum delay time computed in step S502 and the information obtained in steps S503 to S505.

An exemplary method for computing the transmission intervals of the packets 211 in step S506 is described next.

First, the scheduling unit 104 computes a value A using a playback time for a GOP, the amount of generated code of the GOP, and the payload size, as follows:

$$A = \text{playback time for a } GOP/(\text{amount of generated code of the } GOP/\text{payload size}) \quad (4)$$

The value A indicates an average packet transmission interval for a GOP computed simply using the playback time for a GOP and the number of packets without taking into account the delay time.

Subsequently, the scheduling unit 104 divides the amount of code of the I frame by the payload size so as to obtain a value B, as follows:

$$B = \text{amount of code of } I \text{ frame/payload size} \quad (5)$$

The value B indicates the number of packets of the first I frame of the GOP. However, in some cases, packetizing of the first I frame of the GOP is completed at a point of step S506 or the payload size is not a constant value depending on a processing method used. In such cases, it is difficult to determine one equation for computing the value B. In this example, as one of the simplest methods, a method using equations (4) and (5) is described.

Subsequently, the scheduling unit 104 computes a transmission interval of the packets 211 using the computed values A and B and the maximum delay time computed in step S502 and using the following conditional expression:

if ((A×B)≦maximum delay time)
packet transmission interval=A;
else
packet transmission interval=maximum delay time/B More specifically, the scheduling unit 104 determines whether the product of the value A and the value B (=A×B) is smaller than or equal to the maximum delay time computed in step S502. That is, the scheduling unit 104 determines whether a delay time immediately after the I frame, that is, at a time when the delay of a packet transmission time with respect to the frame rate is maximized, is smaller than or equal to the maximum delay time.

If the product of the values A and B is less than or equal to the maximum delay time, the scheduling unit 104 determines that the value A is the transmission interval of the packets 211 of the GOP to be transmitted. However, if the product of the values A and B is greater than the maximum delay time, the scheduling unit 104 determines that a value obtained by dividing the maximum delay time by the value B (=maximum delay time/B) is the transmission interval of the packets 211 of the GOP to be transmitted. In this way, control is performed so that a maximum value of a delay time does not exceed the above-described maximum delay time.

As described above, the packet transmission interval computed using the above-described conditional expression serves as an upper limit value that allows the packet 211 to be transmitted within the maximum delay time. Subsequently, the scheduling unit 104 sends a transmission instruction to the transmission unit 105 so that the packets 211 are transmitted at the determined intervals. Thus, the packets 211 are transmitted to the receiving apparatus at the transmission intervals determined by the scheduling unit 104.

As described above, according to the present exemplary embodiment, the packet transmission intervals are controlled based on the stream characteristic information 215 and the communication characteristic information 213 so that a local variation in the packet transmission interval is reduced. In this way, the packet transmission intervals can be made uniform. Thus, the transmission intervals of the packets 211 can be controlled beyond the limitation imposed by the frame rate of moving image data. As a result, data communication having higher resistance to network failure and having less transmission errors, such as packet loss, can be provided.

While the present exemplary embodiment has been described with reference to the case where the transmission intervals of the packets 211 are controlled on a GOP-to-GOP basis (for MPEG-2) or a GOV-to-GOV basis (for MPEG-4), the present invention is not limited thereto. For example, control may be performed for a plurality of GOPs or GOVs. Alternatively, a GOP or GOV may be divided, and control may be performed for the divided GOP or GOV. Furthermore, the present exemplary embodiment can be applied to stream data having a similar encoding format and a similar frame structure, such as that of MPEG-4 AVC (H.264) or Motion-JPEG. When the present exemplary embodiment is applied to stream data of MPEG-4 AVC (H.264), the processing can be performed on a plurality of frames basis from, for example, an instantaneous decoder refresh (IDR) frame to a frame immediately before the next IDR frame.

In addition, the processes shown in steps S503 to S505 of FIG. 5 may be performed before or after the processes shown in steps S501 and S502.

Second Exemplary Embodiment

A second exemplary embodiment of the present invention is described next. For example, in some cases in which a live image, such as an image captured by a security camera, is delivered, a delay of a transmission time needs to be minimized in order to avoid the delay in playback of the live image. According to the second exemplary embodiment, even in such cases, packet transmission intervals are controlled so that bandwidth overflow of a communication path or buffer overflow in, for example, a router located in a communication path does not occur. The processing of controlling packet transmission intervals performed by the present exemplary embodiment is only partially different from that of the first exemplary embodiment. Accordingly, similar numbering will be used in describing the present exemplary embodiment as was utilized above in describing FIGS. 1 to 5, and detailed descriptions thereof are not repeated.

FIGS. 6A and 6B schematically illustrate an example of a change in packet transmission intervals. A diagram entitled "W/O CONTROL" in FIG. 6A illustrates an example of packet transmission time points when transmission intervals are not controlled.

The diagram entitled "CONTROL 3" in FIG. 6B illustrates an example of packet transmission time points when packet transmission intervals are controlled. In the example shown in FIG. 6B, by increasing the packet transmission time intervals, delay occurs in first three frames with respect to the frame rate of the stream data. However, packet transmission is performed in accordance with the frame rate for the frames subsequent to the fourth frame.

Like the above-described exemplary embodiment, the present exemplary embodiment is described with reference to stream data having a GOP structure having a first I frame and the subsequent 14 P frames ("I, $P_1, P_2, P_3, \ldots P_{14}$").

In the present exemplary embodiment, the packet transmission intervals are computed by using the communication characteristic information. Examples of the communication characteristic information include the effective bandwidth of a communication path available for the communication of the stream data. The effective bandwidth may be estimated using the statistical information obtained by actually measuring the communication path. Alternatively, the effective bandwidth may be preset by a receiving apparatus that receives the stream data. Furthermore, by detecting packet loss and the transmission error rate (the rate of the occurrence of error, such as packet loss and a bit error) during communication of stream data, the effective bandwidth may be estimated using the transmission error rate. The communication characteristic information can be acquired by the communication characteristic information acquiring unit 107.

FIGS. 7A and 7B illustrate an example of a change in the transmission rate when packets are transmitted at transmission intervals as shown in FIGS. 6A and 6B. The diagram entitled "W/O CONTROL" in FIG. 7A illustrates an example of a change in the transmission rate when packet transmission intervals are not controlled. While, FIG. 7B illustrates an example of a change in the transmission rate when packet transmission intervals are controlled as illustrated in FIG. 6B.

When, as shown in FIG. 7A, packet transmission intervals are not controlled, the transmission rate may exceed the effective bandwidth. In such a case, in practice, packet loss may occur in a communication path due to buffer overflow in a router or in a network interface card (NIC) located in the communication path.

According to the present exemplary embodiment, by providing a "minimum packet transmission interval" needed for preventing such packet loss, a change in the transmission rate can be reduced to a value less than or equal to the effective bandwidth. Thus, stream data can be transmitted with a minimum delay.

The scheduling unit 104 acquires an effective bandwidth B, which is a piece of the communication characteristic information 213, from the communication characteristic information acquiring unit 107. The scheduling unit 104 further acquires, from the stream characteristic information acquiring unit 106, an average size $S_{pac}$ of the packets, which is a piece of the stream characteristic information 215, for each frame. Subsequently, the scheduling unit 104 sets a packet transmission interval $\Delta T(D)$ so that the packet transmission interval satisfies the following expression:

$$\Delta T(D) > S_{pac}/B \qquad (6)$$

If a packet is transmitted using a transmission interval $\Delta T(D)$ that satisfies the condition: $\Delta T(D) = S_{pac}/B$, the transmission rate is equal to the effective bandwidth. Accordingly, a margin can be added to a transmission interval $\Delta T(D)$ that satisfies the condition: $\Delta T(D) = S_{pac}/B$, and this value can be used for a minimum value of the transmission interval $\Delta T(D)$. That is, a minimum value of the transmission interval $\Delta T(D)$ determined by using expression (6) is a minimum value for preventing the occurrence of packet loss caused by, for example, a buffer overflow.

In this way, according to the present exemplary embodiment, the minimum value of the packet transmission interval is determined using the effective bandwidth B (an example of the communication characteristic information 213) and the average packet size $S_{pac}$ (an example of the stream characteristic information 215). As a result, it can be prevented that the transmission rate exceeds the effective bandwidth.

In addition, by combining the present exemplary embodiment and the first exemplary embodiment, the maximum value and the minimum value of the packet transmission intervals can be determined, and packets can be transmitted at intervals within a range between the maximum value and the minimum value.

Third Exemplary Embodiment

A third exemplary embodiment of the present invention is described next. The third exemplary embodiment is described with reference to the case where moving image content that is encoded and stored is transmitted. Processing of controlling packet transmission intervals performed by the present exemplary embodiment is only partially different from that of each of the above-described exemplary embodiments. Accordingly, similar numbering will be used in describing the present exemplary embodiment as was utilized above in describing FIGS. 1 to 6, and detailed descriptions thereof are not repeated.

Figure 8A:
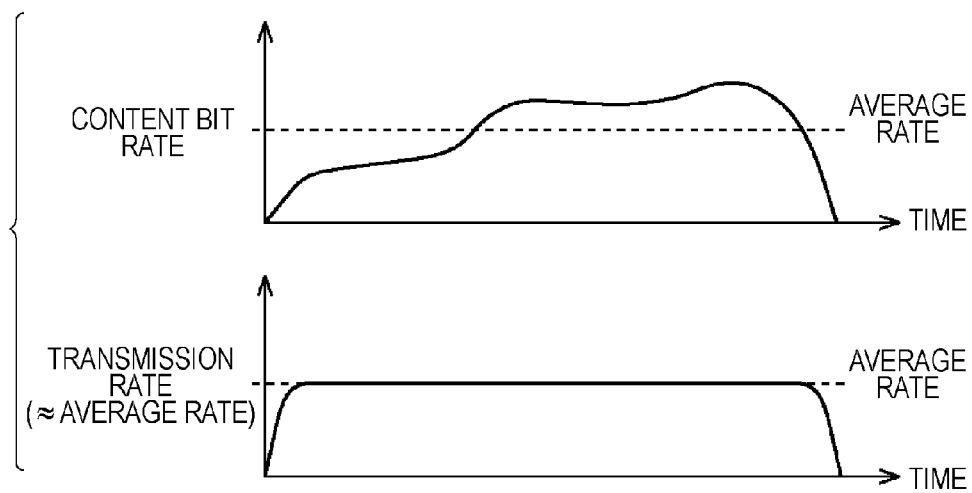
FIGS. 8A and 8B illustrate examples of a relationship between the bit rate of stored moving image content and the transmission rate used for transmitting the moving image content according to a third exemplary embodiment of the present invention.
Figure 8B:
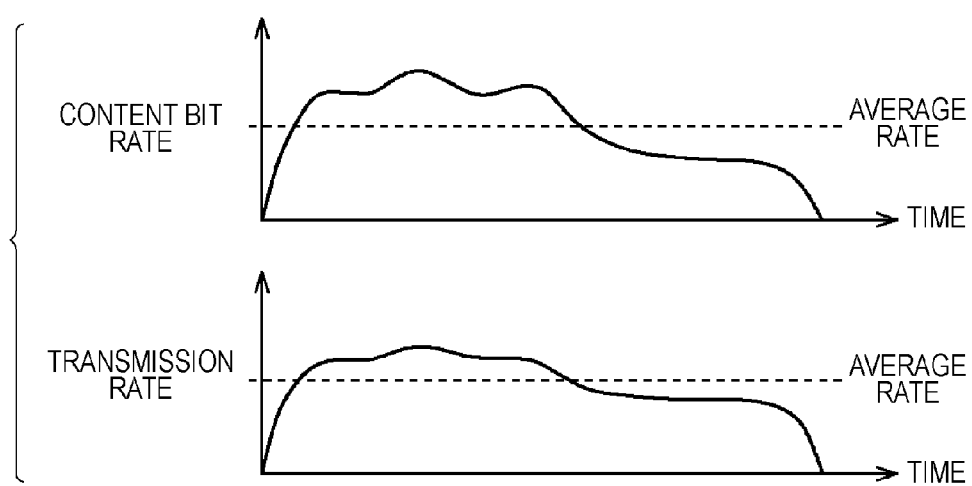

FIGS. 8A and 8B illustrate an example of a relationship between the bit rate of stored moving image content and the transmission rate used when the moving image content is transmitted. A relationship between the bit rate and the transmission rate for content A is shown in FIG. 8A, while a relationship between the bit rate and the transmission rate for content B is shown in FIG. 8B. As described below, in the present exemplary embodiment, an average bit rate of content data is computed or acquired, and the content is transmitted at a transmission rate that is the same as the average bit rate.

For example, for content having a variation in the bit rate, as shown by the content A shown in FIG. 8A, transmission is performed as follows. That is, in the above-described exemplary embodiments, a packet is transmitted with a delay with respect to the frame rate starting from a time point of a first transmission. However, in the present exemplary embodiment, by transmitting a packet at a time point earlier than the frame rate, content can be delivered at a rate that is the same as the average bit rate.

In general, in order to deliver moving image content, an RTP is used. When a packet is transmitted using an RTP, the header of the packet includes time stamp information. Accordingly, although transmission is performed in synchronization with the frame rate in the present exemplary embodiment, a receiving apparatus can display a playback image correctly by using the time stamp. However, since the receiving apparatus may often receive a packet earlier than the time at which the data is to be displayed, a buffer for storing the received data until display processing, such as decoding, is started is needed.

In contrast, in the case of content having a variation in bit rate like that of the content B shown in FIG. 8B, the bit rate for the first half of the data is higher than that for the second half of the data. Accordingly, in order to bring the transmission rate close to the average bit rate, a packet needs to be transmitted by delaying a transmission point with respect to the frame rate.

In such a case, the packet may not arrive before the receiving apparatus starts a display operation depending on the start timing of the display operation performed by the receiving apparatus and the buffer size for received packets. Accordingly, in the present exemplary embodiment, for example, the transmission apparatus can determine the time from when the receiving apparatus starts receiving a packet to when the receiving apparatus starts a display operation, or the transmission apparatus can be notified of the buffer size in the receiving apparatus. In this way, the transmission apparatus controls the delay time of a packet so that buffer overflow or buffer underflow does not occur in the receiving apparatus.

Therefore, in particular, in the case of content having a variation in bit rate, such as the content B, control is performed using a transmission rate close to the average bit rate so that failure of the playback operation caused by a delay of packet arrival times does not occur, as shown in FIG. 8B.

As described above, according to the present exemplary embodiment, the scheduling unit 104 determines, based on the bit rate of stored moving image content, whether packets are transmitted in the manner described in the above-described exemplary embodiments or packets are transmitted earlier than the timing determined by the frame rate. As a result, the scheduling unit 104 can transmit the stored moving image content at a transmission rate close to the average bit rate, and therefore, the occurrence of a transmission error can be prevented.

Fourth Exemplary Embodiment

A fourth exemplary embodiment of the present invention is described next. In the above-described exemplary embodiments, packet transmission intervals are controlled on a packet-to-packet basis. However, in practice, the level of accuracy of a clock of a transmission apparatus, where the clock is a basic unit of processing, may cause problems.

That is, a transmission apparatus having a clock of a low accuracy level may not control packet transmission timing precisely.

In such a transmission apparatus, packet transmission intervals can be controlled by combining a method in which blocks of a plurality of packets are continuously transmitted without controlling the timing with a method in which a packet is transmitted under timing control in accordance with the level of clock accuracy. In the following description, continuous transmission of blocks of a plurality of packets is referred to as "burst transmission".

FIGS. 9A to 9C schematically illustrate an example of a change in packet transmission intervals when packet transmission intervals are controlled on a GOP-to-GOP basis by combining burst transmission with timing control in accordance with the level of clock accuracy. A diagram entitled "W/O CONTROL" in FIG. 9A illustrates an example of packet transmission time points when transmission intervals are not controlled. A diagram entitled "CONTROL 2" in FIG. 9B illustrates an example of packet transmission time points when transmission intervals are controlled on a GOP-to-GOP basis, as described in the first exemplary embodiment. A diagram entitled "CONTROL 4" in FIG. 9C illustrates an example of packet transmission time points when transmission intervals are controlled as described in the present exemplary embodiment.

As described in the first exemplary embodiment, an ideal packet transmission timing is shown in FIG. 9B. However, in transmission apparatuses having a low-level clock accuracy and capable of transmitting a packet at only clock timing points, packets are transmitted through burst transmission, as shown in FIG. 9C. That is, by performing burst transmission at clock timing points that are the closest to the ideal packet transmission timing points, the packet transmission intervals can be averaged.

As described above, according to the present exemplary embodiment, using the transmission intervals, for example, those shown in FIG. 9B, and transmission timing points based on the level of clock accuracy (clock timing), the scheduling unit 104 determines packets to be transmitted through burst transmission at the clock timing. Accordingly, even when the level of clock accuracy of the transmission apparatus is not so high (even when the level of clock accuracy of the transmission apparatus is low), the occurrence of a transmission error can be reduced.

Other Exemplary Embodiments

The functions of the units of the communication apparatuses according to the foregoing exemplary embodiments of the present invention and the steps of the method for controlling communication can be achieved by the operations of programs stored in, for example, a random access memory (RAM) and a read only memory (ROM) of a computer. The present invention encompasses such programs and a computer-readable recording medium for storing the programs.

In addition, the present invention can be embodied in the form of, for example, a system, an apparatus, a method, a program or a storage medium. More specifically, the present invention can be applied to a system including a plurality of units or can be applied to an apparatus including only one unit.

The present invention can also be embodied in the form of software (program code corresponding to the flow chart shown in FIG. 5 of the above-described exemplary embodiment), where program code is directly or remotely supplied to a system or an apparatus, which reads out the supplied program code and executes the program code.

Accordingly, the program code itself installed in the computer in order to practice the functional processes of the present invention by the computer is encompassed in the present invention.

In such a case, the format of the program code having such functions may be any format. For example, the formats of the program code include object code, program code executed by an interpreter, and a script data supplied to an operating system (OS).

Examples of the recording medium for supplying the program code include a floppy disk (trade name), a hard disk, an optical disk, an MO (magneto optical) disk, a CD-ROM (compact disk-read only memory), a CD-R (CD recordable), a CD-RW (CD-rewritable), a magnetic tape, a nonvolatile memory card, a ROM, and a DVD (digital versatile disc) (i.e., a DVD-ROM (DVD-read only memory) and a DVD-R (DVD-recordable)).

In addition, the program code can be supplied as follows. A user accesses an Internet website using a browser of a client computer. Subsequently, the user can download the computer program code according to the present invention or a compressed file including an auto-install function from the website into a recording medium, such as a hard disk.

Furthermore, the program code of the present invention may be divided into a plurality of files, which may be downloaded from different Internet websites. In other words, a WWW (world wide web) server and an FTP (file transfer protocol) server that allow a plurality of users to download a program file that achieves the functions of the present invention using a computer are also encompassed in the present invention.

Additionally, the program according to the present invention can be encrypted and stored into a recoding medium, such as a CD-ROM, to deliver it to users. A user who satisfies a predetermined criterion can download key information for decrypting the encryption from a website on the Internet. By using the key information, the user can install the encrypted program in a computer and can execute the program to achieve the present invention.

Furthermore, the functions of the above-described exemplary embodiments can be achieved by a computer executing the readout program. The functions of the above-described exemplary embodiments can also be achieved by an operating system (OS) running on the computer and executing some of or all of the functions of the above-described exemplary embodiments.

Still furthermore, the present invention can also be achieved by writing the program code read out of the recording medium to a memory of an add-on expansion board of a computer or a memory of an add-on expansion unit connected to a computer and causing a CPU in the add-on expansion board or in the add-on expansion unit to execute some of or all of the functions in the above-described exemplary embodiments under the control of the program code.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-211514 filed Aug. 14, 2007, which is hereby incorporated by reference herein in its entirety.

What is claimed is:

1. A communication control apparatus comprising:
at least one processor coupled via a bus to a memory, the processor being programmed to control one or more of:
an acquiring unit configured to acquire moving image data to be transmitted to a receiving apparatus and delay time information according to playback time of the moving image data;
a generating unit configured to generate packets using the moving image data acquired by the acquiring unit, wherein the generated packets are stored in a memory;
a determining unit configured to determine, in accordance with the delay time information acquired by the acquiring unit, a transmission interval of the packets generated using the moving image data of a plurality of frame including an intra-coded frame and an inter-coded frame such that the transmission interval of the packets of the plurality of frames is longer than a transmission interval based on a number of packets of the intra-coded frame and a frame rate of the moving image data; and
a transmission unit configured to transmit the packets generated by the generating unit to the receiving apparatus based on the transmission interval determined by the determining unit.

2. The communication control apparatus according to claim 1, wherein the determining unit determines an upper limit value of the transmission interval of the packets based on at least one of data characteristic information and communication characteristic information and determines the transmission interval of the packets based on the determined upper limit value.

3. The communication control apparatus according to claim 2, wherein the communication characteristic information includes an accuracy level of a clock of the communication control apparatus, and the determining unit determines packets to be successively transmitted at transmission timing points based on the accuracy level of the clock.

4. The communication control apparatus according to claim 2, wherein the moving image data represents stream data, and the data characteristic information includes at least one of a time needed for decoding or playing back the entire stream data, the size of the entire stream data, and the size of the stream data for each of predetermined processing times.

5. The communication control apparatus according to claim 4, wherein the predetermined processing time is a time based on the inverse of the frame rate.

6. The communication control apparatus according to claim 2, wherein the moving image data represents stream data, and the data characteristic information includes at least one of a time needed for decoding or playing back a predetermined unit of processing that constitutes the stream data and that includes at least one frame, the size of stream data for each of the predetermined units of processing, the largest frame size in the predetermined unit of processing, and one of a decoding time and playing back time of a frame included in the predetermined unit of processing.

7. The communication control apparatus according to claim 2, wherein the communication characteristic information includes at least one of the size of the packet, an accuracy level of a clock referenced when transmission processing of the packet is performed, a communication rate available for communication, a buffer size needed for decoding or playing back stream data, and an error rate of an error occurring in a communication path.

8. The communication control apparatus according to claim 1,
wherein the acquiring unit acquires a bit rate of the moving image data corresponding to a first time period and a second time period following the first time period, and
the determining unit determines the transmission interval of the packets based on the bit rate of the moving image data such that the transmission intervals of the moving image data of the first and second time periods are equal when the bit rate of the moving image data of the first time period is lower than a predetermined bit rate and the bit rate of the moving image data of the second time period is higher than the predetermined bit rate.

9. A method for controlling communication, the method comprising:
acquiring moving image data to be transmitted to a receiving apparatus and delay time information according to playback time of the moving image data;
generating packets using the moving image data acquired in the acquiring step;
determining, in accordance with the delay time information acquired in the acquiring step, a transmission interval of the packets generated using the moving image data of a plurality of frames including an intra-coded frame and an inter-coded frame such that the transmission interval of the packets of the plurality of frames is longer than a transmission interval based on a number of packets of the intra-coded frame and a frame rate of the moving image data; and
transmitting packets generated in the generating step based on the transmission interval determined in the determining step.

10. The method according to claim 9, wherein an upper limit value of the transmission interval of the packets is determined in the determining step based on at least one of data characteristic information and communication characteristic information, and the transmission interval of the packets is determined based on the upper limit value.

11. The method according to claim 9, wherein a bit rate of the moving image data corresponding to a first time period and a second time period following the first time period is acquired in the acquiring step, and the transmission interval of the packets is determined in the determining step based on the bit rate of the moving image data such that the transmission intervals of the moving image data of the first and second time periods are equal when the bit rate of the moving image data of the first time period is lower than a predetermined bit rate and the bit rate of the moving image data of the second time period is higher than the predetermined bit rate.

12. A computer-executable program code stored on a non-transitory storage medium for causing a computer to execute a method for controlling communication, the method comprising:
acquiring moving image data to be transmitted to a receiving apparatus and delay time information according to playback time of the moving image data;
generating packets using the moving image data acquired in the acquiring step;
determining, in accordance with the delay time information acquired in the acquiring step, a transmission interval of the packets generated using the moving image data of a plurality of frames including an intra-coded frame and an inter-coded frame such that the transmission interval of the packets of the plurality of frames is longer than a transmission interval based on a number of packets of the intra-coded frame and a frame rate of the moving image data; and transmitting the packets generated in the generating step based on the transmission interval determined in the determining step.

13. The computer-executable program code according to claim 12, wherein an upper limit value of the transmission interval of the packets is determined in the determining step based on at least one of data characteristic information and communication characteristic information, and the transmission interval of the packets is determined based on the upper limit value.

14. The computer-executable program code according to claim 12, wherein a bit rate of the moving image data corresponding to a first time period and a second time period following the first time period is acquired in the acquiring step, and the transmission interval of the packets is determined in the determining step based on the bit rate of the moving image data such that the transmission intervals of the moving image data of the first and second time periods are equal when the bit rate of the moving image data of the first time period is lower than a predetermined bit rate and the bit rate of the moving image data of the second time period is higher than the predetermined bit rate.

* * * * *